United States Patent
Kaneda et al.

[11] Patent Number: 5,828,503
[45] Date of Patent: Oct. 27, 1998

[54] DRIVING DEVICE AND OPTICAL APPARATUS HAVING THE SAME

[75] Inventors: Naoya Kaneda; Junichi Murakami, both of Kanagawa-ken, Japan

[73] Assignee: Canon Kabushiki Kaisha, Tokyo, Japan

[21] Appl. No.: 557,497

[22] Filed: Nov. 14, 1995

[30] Foreign Application Priority Data

Nov. 17, 1994 [JP] Japan ................................ 6-309559

[51] Int. Cl.$^6$ .......................... G02B 7/02; G03B 17/00
[52] U.S. Cl. .......................................... 359/824; 396/85
[58] Field of Search ................ 354/824; 396/75, 396/85, 86; 359/823, 694

[56] References Cited

U.S. PATENT DOCUMENTS

| | | | |
|---|---|---|---|
| 4,353,634 | 10/1982 | Himmelsbach | 359/694 |
| 4,534,624 | 8/1985 | Toda et al. | 350/429 |
| 4,615,585 | 10/1986 | Van Sluys | 359/824 |
| 4,639,084 | 1/1987 | Kugioka | 359/824 |
| 4,676,605 | 6/1987 | Toda | 359/696 |
| 4,749,269 | 6/1988 | Nakashima et al. | 359/696 |
| 4,785,210 | 11/1988 | Maruyama et al. | 359/696 |
| 4,859,042 | 8/1989 | Tanaka | 359/687 |
| 4,862,441 | 8/1989 | Yumura et al. | 369/44.1 |
| 4,920,369 | 4/1990 | Kaneda et al. | 354/400 |
| 5,005,956 | 4/1991 | Kaneda et al. | 350/429 |
| 5,134,524 | 7/1992 | Hamand | 359/687 |
| 5,146,071 | 9/1992 | Okubo et al. | 359/698 |
| 5,289,318 | 2/1994 | Sekine et al. | 359/813 |

FOREIGN PATENT DOCUMENTS

| | | |
|---|---|---|
| 0458694 | 11/1991 | European Pat. Off. . |
| 57-108806 | 7/1982 | Japan . |
| 58-16208 | 1/1983 | Japan . |
| 59-198409 | 11/1984 | Japan . |
| 60-209937 | 10/1985 | Japan . |
| 62-75409 | 4/1987 | Japan . |
| 63-007525 | 1/1988 | Japan . |
| 63-013138 | 1/1988 | Japan . |
| 63-163312 | 7/1988 | Japan . |
| 1130114 | 5/1989 | Japan . |
| 01188811 | 7/1989 | Japan . |
| 1-280709 | 11/1989 | Japan . |
| 1-321416 | 12/1989 | Japan . |
| 2-144509 | 6/1990 | Japan . |
| 4-322155 | 11/1992 | Japan . |
| 5-323175 | 12/1993 | Japan . |

*Primary Examiner*—Georgia Y. Epps
*Assistant Examiner*—Ricky Mack
*Attorney, Agent, or Firm*—Fitzpatrick, Cella, Harper & Scinto

[57] ABSTRACT

A driving device includes a forming part for forming one magnetic circuit, a first coil disposed at a first driven member and a second coil disposed at a second driven member. The first and second coils are provided within the one magnetic circuit and arranged to move by being respectively supplied with currents.

13 Claims, 14 Drawing Sheets

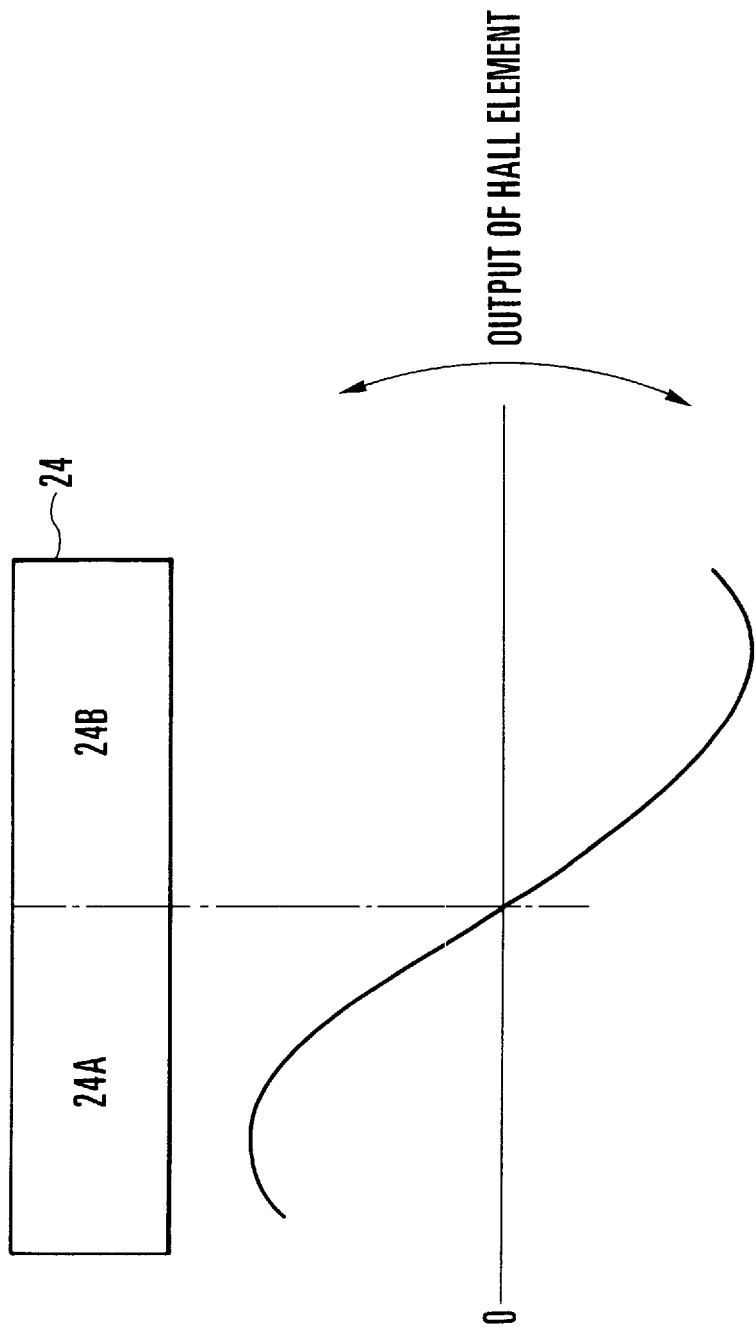

DRIVING DEVICE AND OPTICAL APPARATUS HAVING THE SAME

BACKGROUND OF THE INVENTION

1. Field of the Invention

This invention relates to a driving device and more particularly to a driving device arranged to drive a phototaking lens in an image pickup apparatus, such as a camera or a video camera, or to drive a projection lens in a video projector, and also relates to an optical apparatus, such as a camera, a video camera or a video projector, having the driving device.

2. Description of the Related Art

Zoom lenses of the kind having a zoom ratio of 10× or thereabout have recently come to be employed as the photo-taking lenses of video cameras in general. FIG. 1 is a vertical sectional view showing, as a typical example, the lens arrangement of a lens barrel of such a zoom lens. The lens barrel includes a fixed front lens group 1, a variator lens group 2, a fixed lens group 3 and a focusing (compensator) lens group 4.

A guide bar 133 is provided for preventing a turning motion. A feed bar 134 is arranged for feeding the variator lens group 2. A fixed lens tube 135 holds the front lens group 1. An iris unit 136 is inserted, in this case, perpendicular to the paper surface of the drawing. A stepping motor 137 is arranged to serve as a focusing motor and has an output shaft 138. The output shaft 138 is provided with an external thread for moving the focusing lens group 4. An arm part 139 is formed integrally with a moving frame 140 for the focusing lens group 4 and has a through hole, which is provided with an internal thread which is in mesh with the external thread of the output shaft 138. Guide bars 141 and 142 are provided for the focusing-lens-group moving frame 140. A rear plate 143 is arranged to retain in position the guide bars 141 and 142. The lens barrel further includes a relay holder 144, a zoom motor 145 and a reduction gear unit 146 for the zoom motor 145. An interlocking gear 147 is secured to an output shaft 146a of the reduction gear unit 146. An interlocking gear 148 is secured to a variator-lens-group feeding bar 134 and is in mesh with the interlocking gear 147.

With the lens barrel configured in the above-stated manner, when the stepping motor 137 is driven to act, a screw feeding action of the output shaft 138 of the stepping motor 137 causes the focusing lens group 4 to move in the direction of an optical axis. Further, when the zoom motor 145 is driven to act, the shaft 134 is rotated through the interlocking gears 147 and 148 to cause the variator lens group 2 to move in the direction of the optical axis.

FIG. 2 shows the relative positions of the variator lens group 2 and the focusing lens group 4 as obtained for various object distances. In FIG. 2, the relative positions obtained in focusing on objects of shooting located at an infinity distance and distances of 2 m, 1 m, 80 cm and 0 cm are shown by way of example. In the case of an inner focusing type zoom lens in which a focusing action is performed by a lens group located behind the variator lens group 2, the positional relation between the variator lens group 2 and the focusing lens group 4 varies with the object distance, as shown in FIG. 2. Therefore, unlike a front-lens focusing type zoom lens in which a focusing action is performed with the front lens group 1 located in a foremost position by simply arranging a cam ring, the lens groups cannot be interlocked by a simple mechanical arrangement in this case.

Therefore, with the zoom lens arranged as shown in FIG. 1, driving only the zoom motor 145 in a simple manner would bring about an out-of-focus state. In view of this, it has been practiced to control the positional relation between the lens groups as shown in FIG. 2 appositely in accordance with the object distance.

For example, a method of tracing the locus of the positional relation between the variator lens group 2 and the focusing lens group 4 according to the object distance has been disclosed in Japanese Laid-Open Patent Applications No. HEI 1-280709, No. HEI 1-321416 and No. HEI 2-144509. In the case of Japanese Laid-Open Patent Application No. HEI 1-280709, the positional relation between the variator lens group 2 and the focusing lens group 4 is maintained in a manner as shown in FIGS. 3, 4 and 5.

In FIG. 3 which is a block diagram, reference numerals 1 to 4 denote the same lens groups as those shown in FIG. 1. The position of the variator lens group 2 is arranged to be detected by means of a zoom encoder 149. The zoom encoder 149 may be, for example, of a potentiometer type arranged to have a brush fixedly mounted on a moving ring of the variator lens group 2 and to cause the brush to slide over a circuit board on which a resistance pattern is printed.

An aperture encoder 150 is arranged to detect an aperture value, for example, by using an output of a Hall element 163 which is disposed in an iris meter. An image sensor 151 is a CCD or the like. A camera processing circuit 152 is arranged to process a signal outputted from the image sensor 151. A Y signal obtained by the camera processing circuit 152 is supplied to an AF (automatic focusing) circuit 153. The AF circuit 153 is arranged to make a discrimination between an in-focus state and a defocused state and, in the event of a defocused state, to decide whether it is a near-focus or far-focus state and also the amount of defocus. The result of the action of the AF circuit 153 is supplied to a CPU 154.

A power-on reset circuit 155 is arranged to perform resetting actions of varied kinds when a power supply is turned on. A zoom operation circuit 156 is arranged to supply the CPU 154 with information about an operation performed on a zoom switch 157 by the camera operator when the operation is performed. Memory parts 158, 159 and 160 are arranged to store direction data, speed data and boundary data, respectively. A driver 161 is arranged to drive a zoom motor 145. A driver 162 is arranged to drive a stepping motor 137. The number of pulses inputted to the stepping motor 137 is continuously counted within the CPU 154 on the basis of a computation starting position determined by a power-on resetting action of the power-on reset circuit 155. The number of pulses thus counted is used as encoder information on the absolute position of the focusing lens group 4.

In the arrangement described above, the position of the variator lens group 2 and that of the focusing lens group 4 are determined respectively by the zoom encoder 149 and the number of pulses inputted to the stepping motor 137. According to these positions, a point on a map shown in FIG. 2 is determined. The map shown in FIG. 2 is divided into small strip-shaped areas I, II, III,—as shown in FIG. 4. In FIG. 4, hatched parts indicate areas where the lens groups 2 and 4 are inhibited from being located. With one point on the map determined in this manner, one of these small divided areas to which this point belongs can be also determined.

A rotating speed and a rotating direction of the stepping motor 137 obtained from a locus passing the center of each divided area are stored in the memory parts 159 and 158, respectively, for each of the divided areas.

In the case of FIG. 4, for example, the axis of abscissa (for the positions of the variator lens group 2) is divided into 10 zones. Assuming that the speed of the zoom motor 145 is set to move the variator lens group 2 from a telephoto end position to a wide-angle end position in 10 seconds, a length of time required for passing one zone during zooming is one second. Referring to FIG. 5, which shows in an enlarged state the strip-shaped area III shown in FIG. 4, a locus 164 passes the center of the area III, a locus 165 passes the lower left corner thereof, and a locus 166 passes the upper right corner thereof. The inclinations of the loci 164, 165 and 166 are different from one another. The center locus 164 can be almost exactly traced by moving the focusing lens group 4 at a speed of "X mm/1 sec".

Assuming that the speed thus obtained is called an area representative speed, the memory part 159 for speed data stores as many speed data as the number of the small areas. Further, with this speed indicated as a locus 168, the speed of the stepping motor 137 is set by finely adjusting the area representative speed, for example, to a locus 167 or a locus 169 according to the result of detection made by an automatic focusing device. Further, since the rotating direction of the stepping motor 137 varies according to the area even in the same zooming process from the telephoto end position to the wide-angle end position and vice versa, data indicative of the plus and minus signs are stored in the direction data memory part 158.

As described above, the speed of the stepping motor 137 is set by further adjusting the area representative speed obtained from the position of the variator lens group 2 and that of the focusing lens group 4, according to the result of detection made by the automatic focusing device. The position of the focusing lens group 4 is controlled by using the adjusted speed of the stepping motor 137 while the zoom motor 145 is in the process of driving. With the position of the focusing lens group 4 controlled in this manner, an in-focus state can be maintained during a zooming process even in the case of the inner focus type zoom lens.

A method wherein speeds such as the speeds indicated by the loci 167 and 169 are stored in addition to the area representative speed of the locus 168 for each of the areas and one of the three speeds is selected according to the result of detection made by an automatic focusing device, has been disclosed, for example, in U.S. Pat. No. 5,005,956.

In addition to the methods of storing the speeds as described above, there have been employed various other methods. For example, in one method, a locus passing through a point on a map defined by the positions of the variator lens group 2 and the focusing lens group 4 is computed and traced. In another method, a plurality of loci are stored as the positions of the focusing lens group 4 according to the positions of the variator lens group 2.

In the case of the latter method, a plurality of loci for object distances such as ∝, 2 m, 1 m and 80 cm, as shown in FIG. 2, are stored as the positions of the focusing lens group 4 corresponding to the positions of the variator lens group 2 which are obtained by dividing, for example, a distance from the wide-angle end position to the telephoto end position into 64 positions. During the process of a zooming action, the two lens groups 2 and 4 are driven to maintain the positional relation between the two. In a case where zooming is performed for an object distance other than the stored object distances, the positions of the two lens groups 2 and 4 are obtained through a computing operation from locus for stored object distances before and after the object distance which is not stored. This method is disclosed in Japanese Laid-Open Patent Application No. HEI 1-321416.

The method for moving the focusing lens group 4 in an electronic interlocking manner according to the movement of the variator lens group 2 as mentioned above is called a zoom tracking method or an electronic cam.

While the lens driving devices of the prior art have been described above with respect to the lens type shown in FIG. 1, the zoom tracking method of course applies to any other cases where a plurality of lens groups are arranged to be moved in an interlocked manner in zooming.

The zoom tracking method necessitates a driving means for moving the lens groups in the direction of an optical axis and a detecting means for detecting positions of the lens groups. In the case of the prior art example referred to above, a DC motor is employed as a means for driving the variator lens group 2, a potentiometer type encoder is employed as a means for detecting the position of the variator lens group 2 (the zoom encoder 149), the stepping motor 137 is employed as a means for driving the focusing lens group 4, and the position of the focusing lens group 4 is detected by continuously counting the number of driving pulses applied to the stepping motor 137 after a start position is decided by the power-on reset circuit 155. It has been also well known, besides the combination mentioned above, to use stepping motors for driving both the two lens groups 2 and 4.

On the other hand, it has recently become desirous that cameras and video cameras are arranged to have a higher quality with respect to quietness and a high performance. In an example of an arrangement to meet this requirement, a so-called voice coil motor (hereinafter abbreviated as VCM) is employed as a quiet driving means for moving a lens group. In the case of the VCM, a magnet and a coil are arranged on the outer circumferential part of a lens-group holding frame with one disposed at the holding frame and the other at a fixed lens tube.

FIG. 6 shows this example in an exploded oblique view. A lens holding frame 211 holds lenses 201b1 to 201b3. A magnet 215 which is radially magnetized is bonded to the outer circumferential part of the lens holding frame 211. A coil 216 which is bonded to inner circumference sides of yokes 217a and 217b and wound in the circumferential direction thereof is arranged on the outer circumference of the magnet 215 across an appropriate space. The lens holding frame 211 is carried by two guide bars 203a and 203b to be movable in the direction of an optical axis and is thus arranged to move by receiving a force in the direction of the optical axis when a current is allowed to flow through the coil 216.

A lens driving system using the above-stated VCM is next described as follows: FIG. 7 shows in a block diagram the lens driving system using the VCM. The system includes a differential amplifier 230, a phase compensation filter 231, an amplifier 232 which has a gain K, a driver 233 and a VCM 234. The VCM 234 has a coil resistance R, a magnetic flux density B across the coil and an effective coil length L.

An encoder (sensor) 235 is arranged to detect the position of a lens to be driven by the VCM 234. The encoder 235 may be of a linear type arranged to trace a gray code pattern with a brush, of a type having a light emitting element such as an iRED or the like and a photo-electric conversion element disposed at a lens holding frame and a fixed lens tube, or of a type having a magnet which is multi-pole magnetized in the moving direction at a predetermined pitch and an MR (magnetoresistive) element which is sensitive of magnetic changes of the magnet disposed respectively at a lens holding frame and a fixed lens tube.

The operation of the driving system (or position control system) using the VCM is described with reference to FIG.

7 as follows: When a target position or a target signal for positioning a lens is given, the differential amplifier 230 compares the target signal with the current lens position signal outputted from a sensor. A signal indicative of a difference or deviation thus obtained is outputted from the differential amplifier 230. The deviation signal comes through the phase compensation filter 231 to the amplifier 232 to be multiplied by the value K. The amplified signal is then applied through the driver 233 to the VCM 234 as a driving voltage. The driving voltage is converted into a current I by 1/R. The current I is then converted into a VCM driving thrust F according to a magnetic flux density B and an effective coil length L (F=B·I·L). The driving thrust F acts in the direction of decreasing the amount of deviation of the lens, so that the lens can be set at the target position.

FIGS. 8(a), 8(b) and 8(c) show another example of use of the VCM. The VCM 234 which is shown in FIG. 6 is arranged such that the magnet 215 is secured to the lens holding frame 211 while the coil 216 is fixed to the yokes 217a and 217b at its outer circumference, and the magnet 215 is thus arranged to move together with the lens holding frame 211 with respect to the fixed coil 216. In the case of the type shown in FIGS. 8(a) to 8(c), on the other hand, a coil 243 is arranged to move together with a lens holding frame 242 with respect to a fixed magnet 244. FIG. 8(a) is a vertical sectional view showing a lens barrel to which the VCM is applied for driving a focusing lens. FIG. 8(b) is a sectional view taken on a line A—A shown in FIG. 8(a).

Referring to FIGS. 8(a) to 8(c), a focusing lens group 241 is secured to the lens holding frame 242 and is carried by two guide bars 247a and 247b to be movable in the direction of an optical axis 240. A bobbin 242a is secured to the lens holding frame 242. The coil 243 is wound around the bobbin 242a. As shown in FIG. 8(c), a yoke 245 which is formed with four parts each approximately of a U shape is secured to the lens barrel 246. The magnet 244 is secured to the inner face of the yoke 245 in a state of being opposed to the coil 243. Therefore, the focusing lens group 241 can be controlled and driven in the direction of the optical axis 240 by controlling the amount of current flowing to the coil 243.

The driving devices of the prior art have been arranged to drive one lens group in the direction of an optical axis by using one magnetic circuit. Therefore, a plurality of magnetic circuits have been arranged in cases where a plurality of lens groups are to be individually driven in the direction of an optical axis.

SUMMARY OF THE INVENTION

It is an object of this invention to provide a driving device which is capable of driving a plurality of driven members individually along one and the same axis with a simpler arrangement than the conventional device, and to provide an optical apparatus having the driving device.

To attain this object, a driving device according to one aspect of this invention comprises forming means for forming one magnetic circuit, a first coil disposed at a first driven member, and a second coil disposed at a second driven member. The first and second coils are provided within the one magnetic circuit and arranged to move by being respectively supplied with currents.

A driving device according to another aspect of this invention comprises forming means for forming a magnetic circuit and a coil provided within the magnetic circuit. The coil is disposed at a driven member and is arranged to move by being supplied with a current. The coil is provided with a sensor for detecting the intensity of a magnetic field. An output of the sensor is used to detect a position of the coil.

A driving device according to a further aspect of this invention comprises forming means for forming a magnetic circuit and a coil provided within the magnetic circuit. The coil is disposed at a lens and is arranged to move along an axis by being supplied with a current. Further, the forming means includes a first yoke, a second yoke and a permanent magnet disposed between the first yoke and the second yoke. Each of the first and second yokes is in a flat plate shape. The permanent magnet is formed in a flat plate shape with a plurality of magnetic poles aligned along the axis. The first and second yokes and the permanent magnet are arranged to overlap each other and in parallel to each other.

The above and other objects and features of this invention will become apparent from the following detailed description of embodiments thereof taken in conjunction with the accompanying drawings.

BRIEF DESCRIPTION OF THE DRAWINGS

FIG. 15 is an output characteristic diagram of a Hall element.

DETAILED DESCRIPTION OF THE PREFERRED EMBODIMENTS

Figure 1:
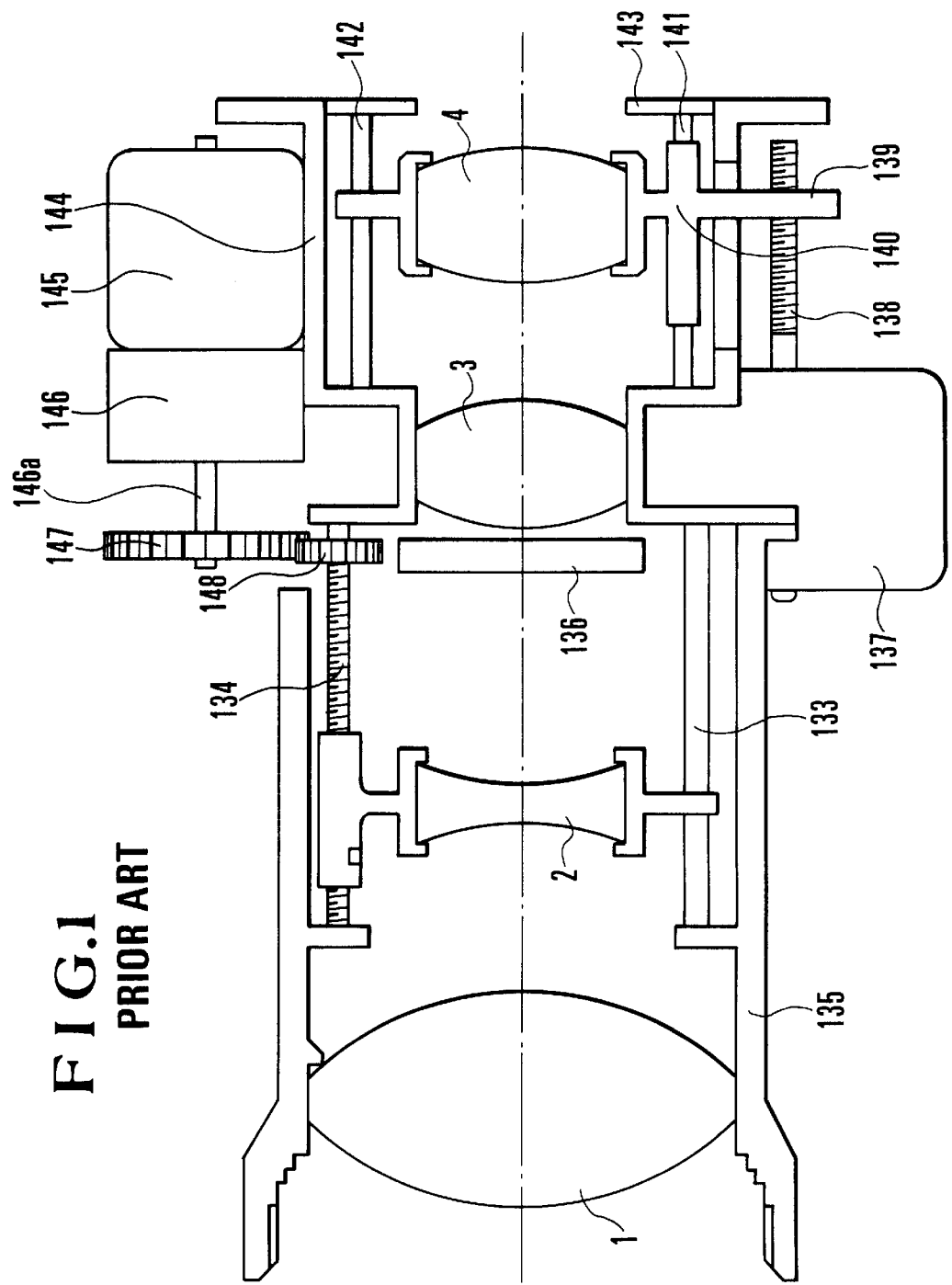
FIG. 1 is a vertical sectional view of a lens barrel showing an ordinary zoom lens arrangement.
Figure 2:
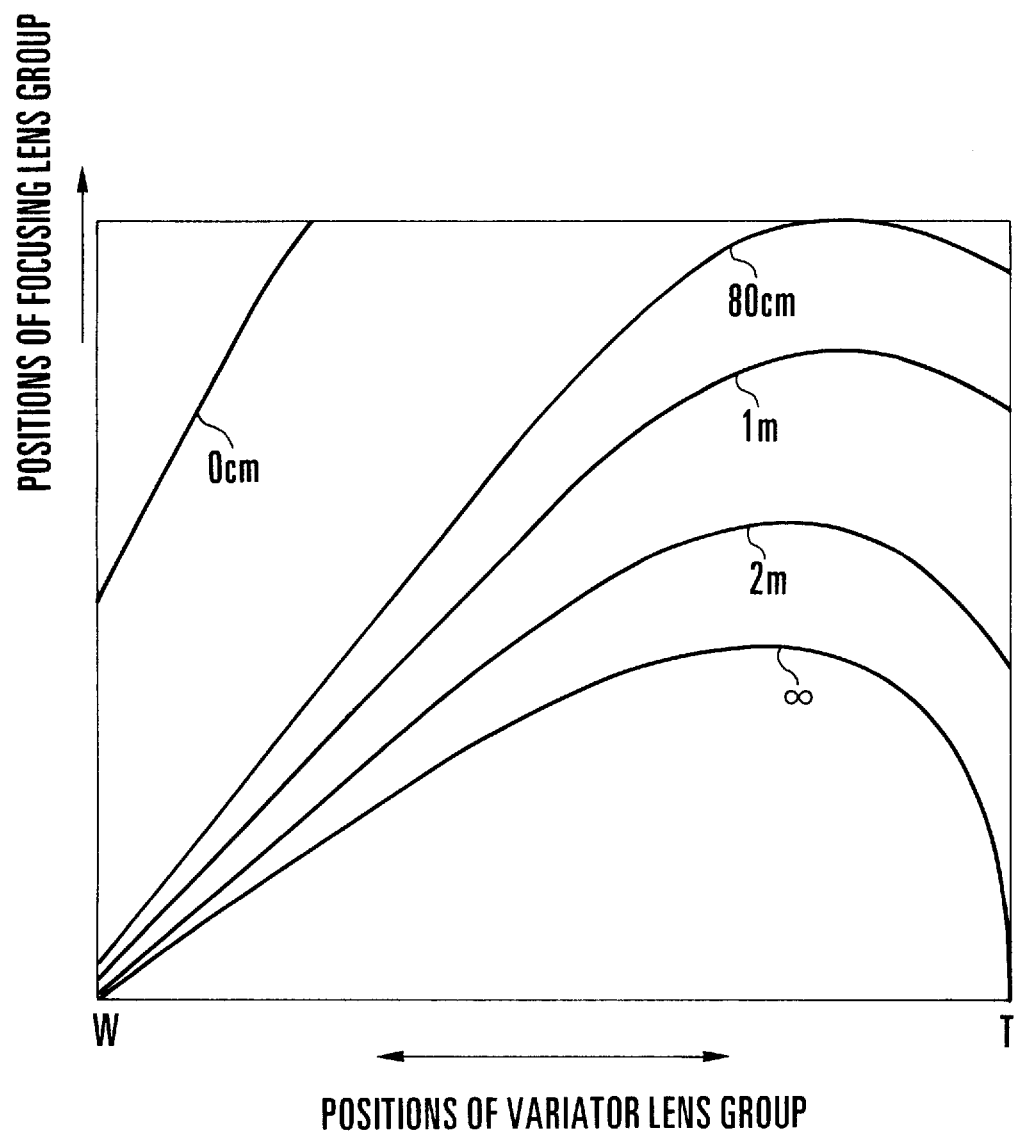
FIG. 2 is a characteristic diagram showing the positional relation of a variator lens group and a focusing lens group for each of various object distances.
Figure 3:
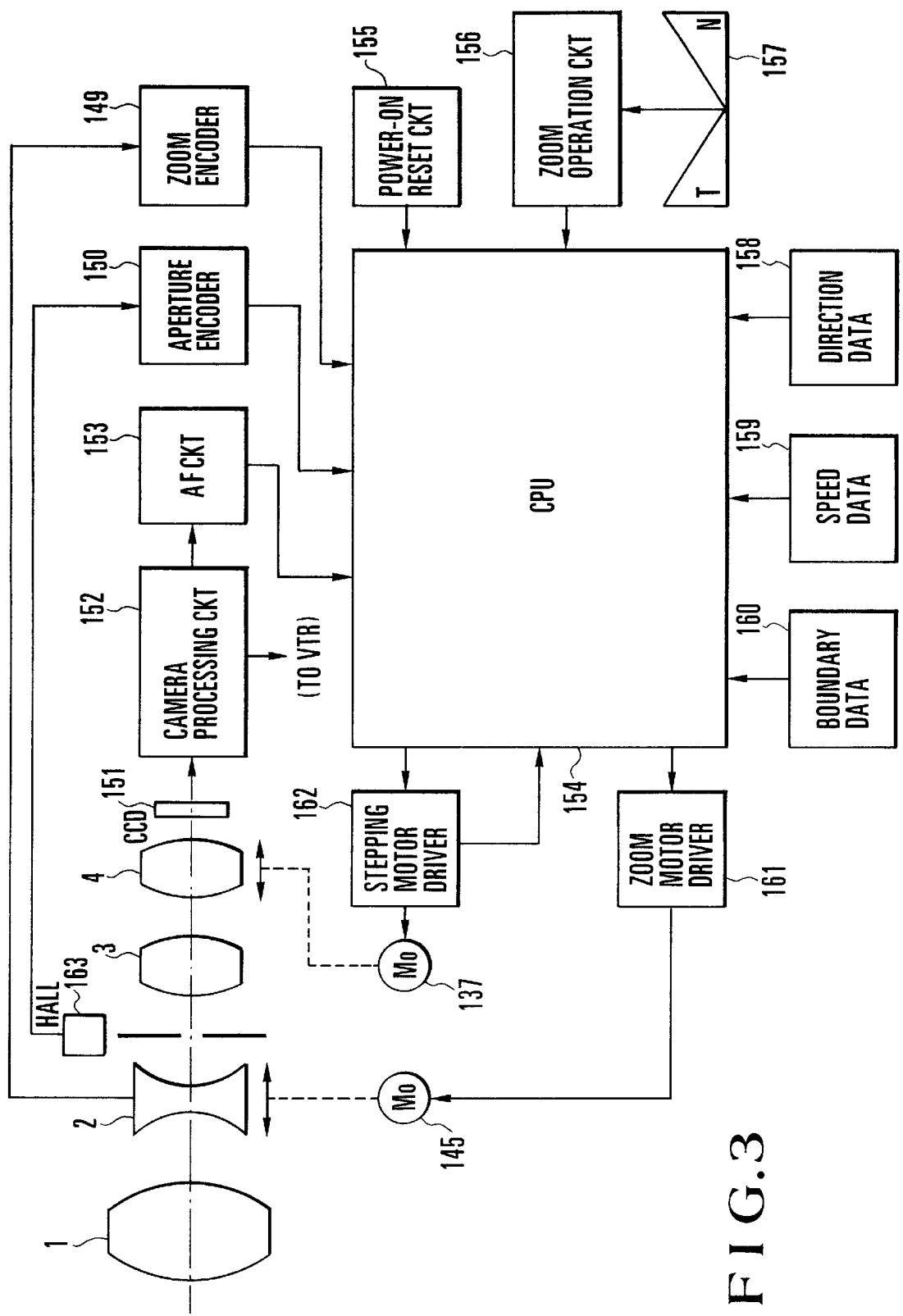
FIG. 3 is a block diagram showing the arrangement of the conventional lens driving device.
Figure 4:
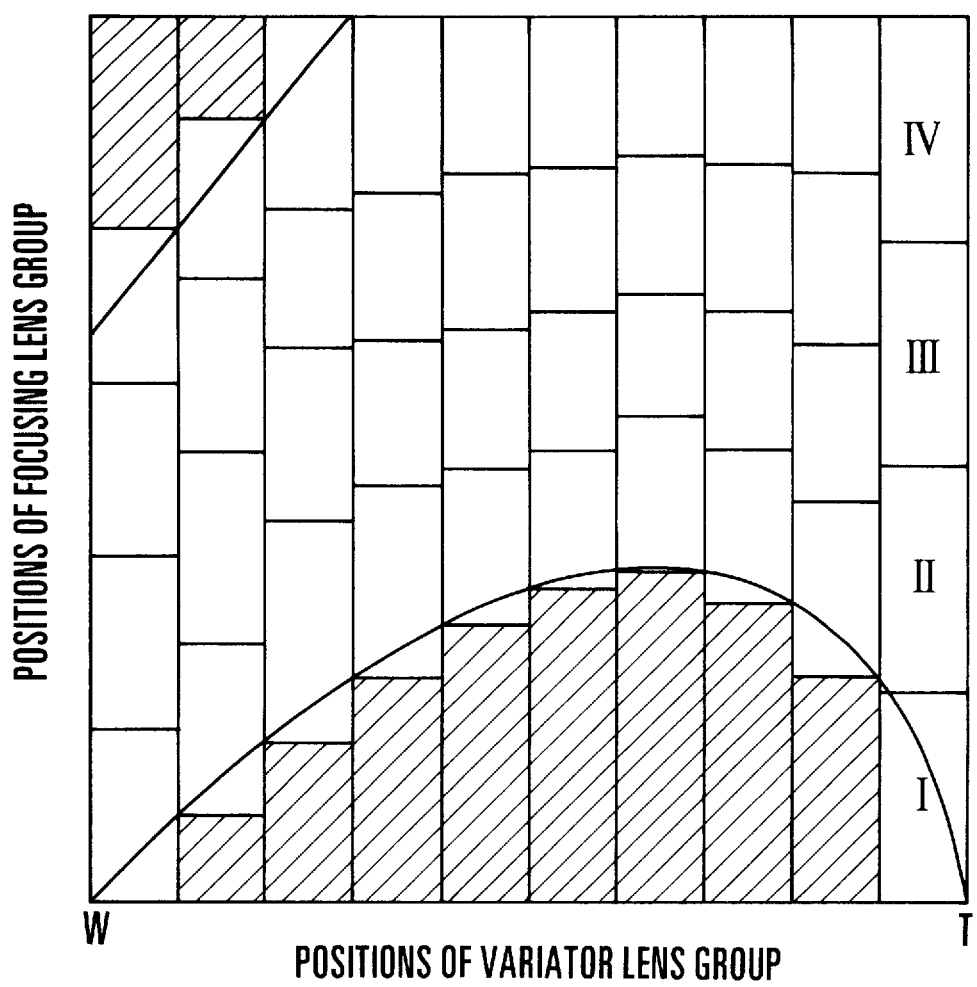
FIG. 4 is a characteristic diagram showing the positional relation of the variator lens group and the focusing lens group.
Figure 5:
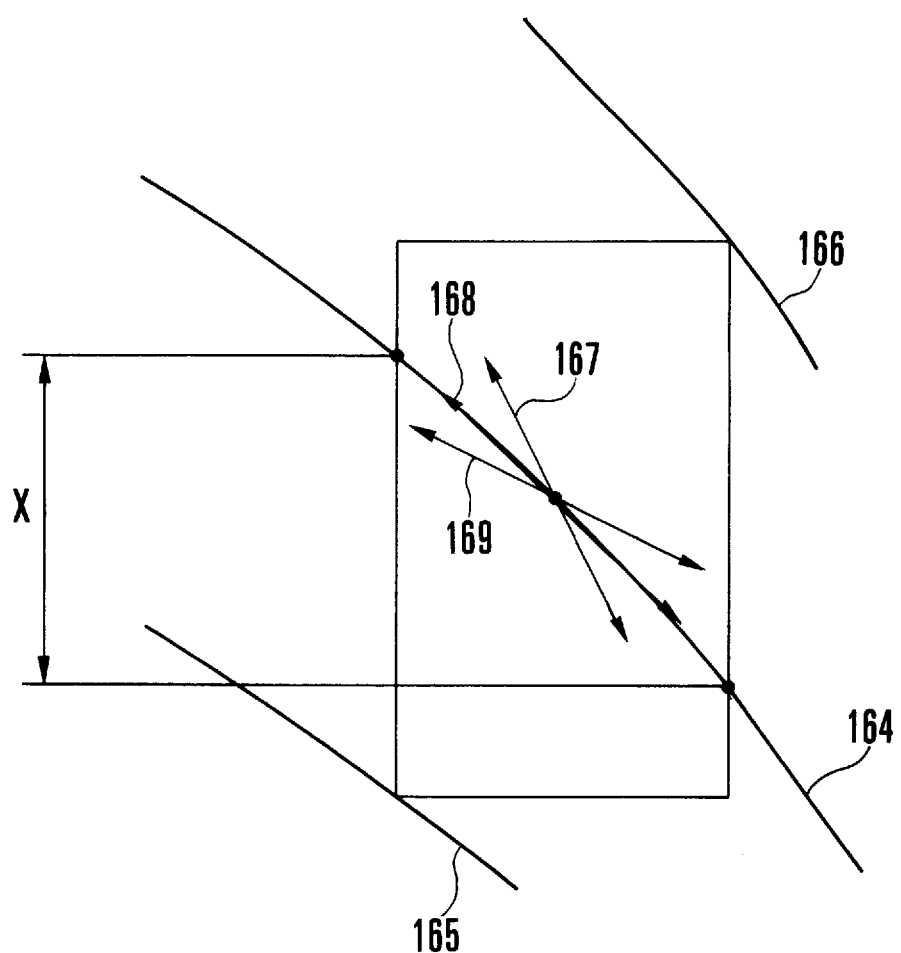
FIG. 5 is an enlarged view of a part of FIG. 4.
Figure 6:
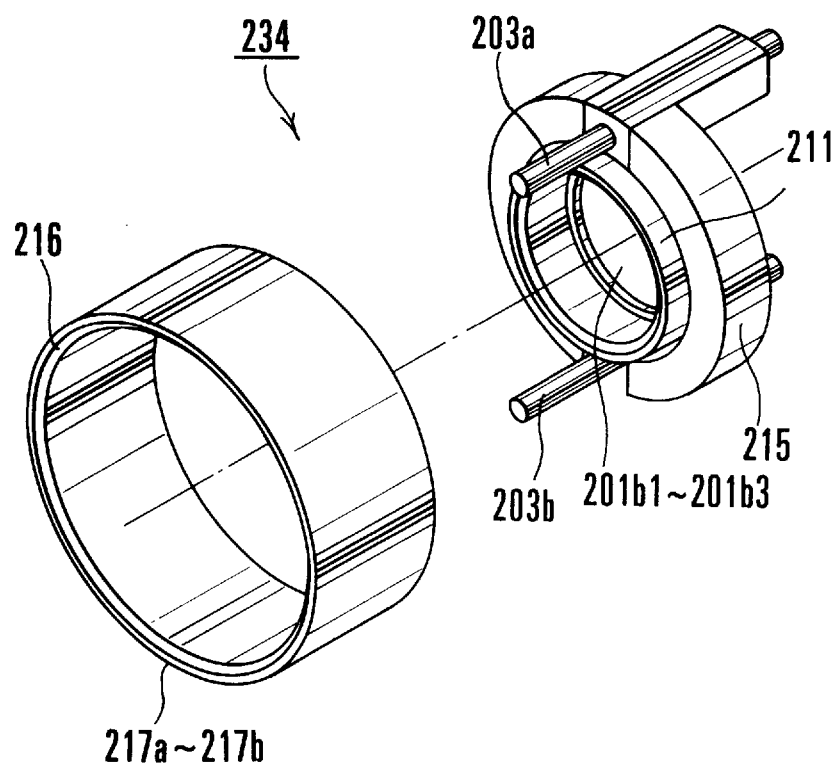
FIG. 6 is an exploded oblique view showing a lens driving device using a VCM.
Figure 7:
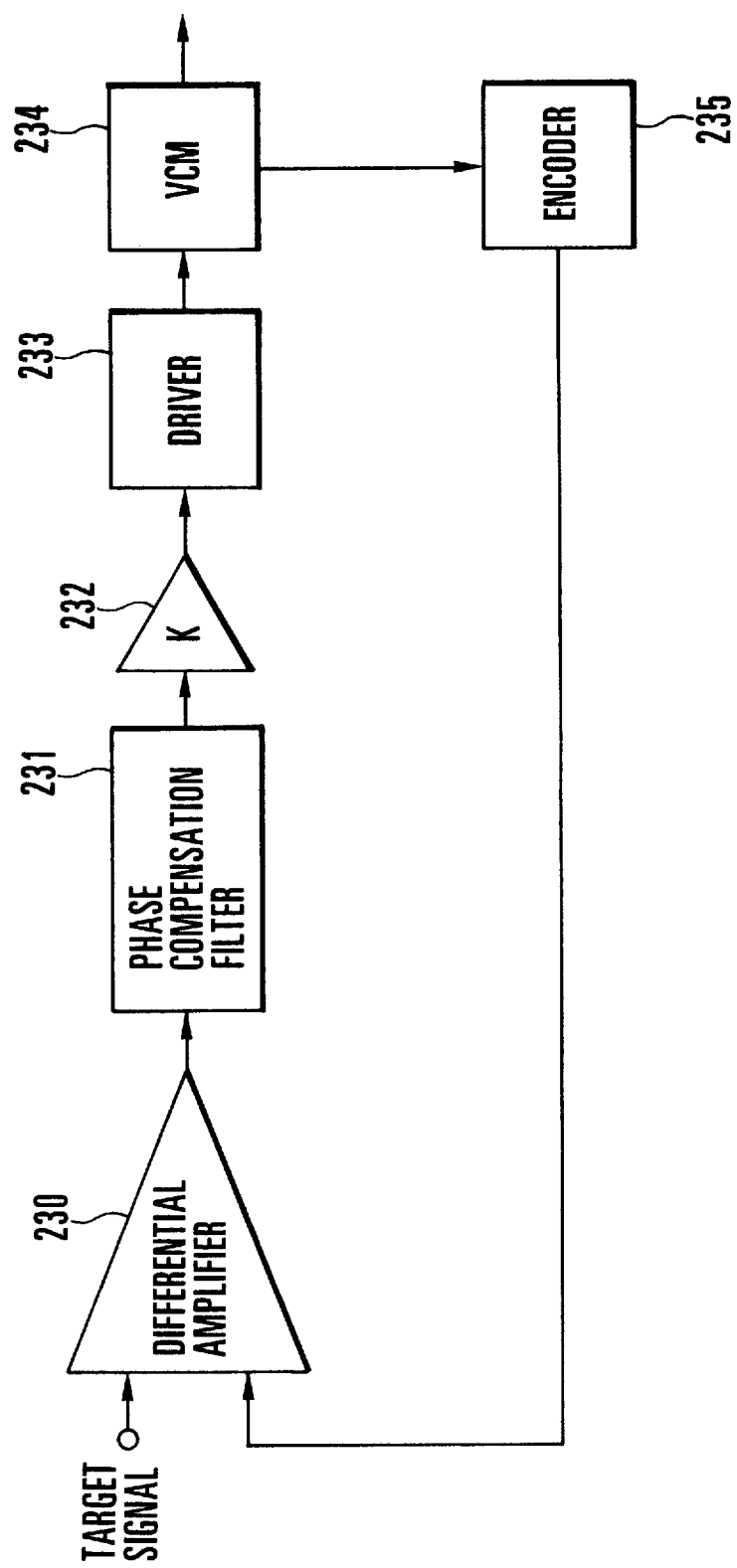
FIG. 7 is a block diagram showing a VCM driving system.
Figure 8A:
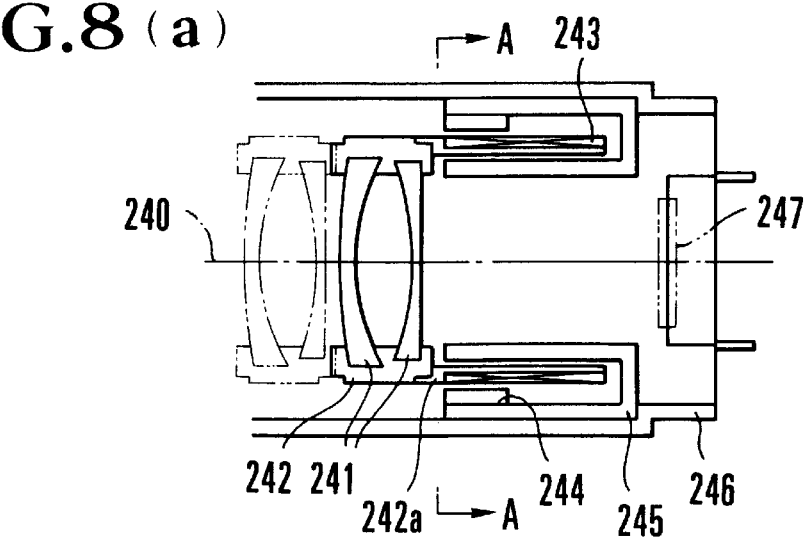
FIGS. 8(a) to 8(c) show another example of use of a VCM, FIG. 8(a) being a vertical sectional view of a lens barrel, FIG. 8(b) being a cross sectional view taken on a line A—A of FIG. 8(a), and FIG. 8(c) being an oblique view showing a yoke.
Figure 8B:
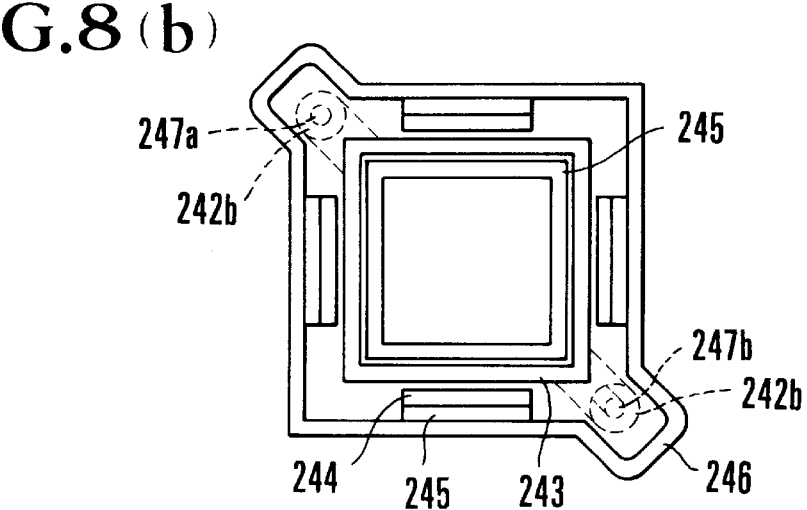
Figure 8C:
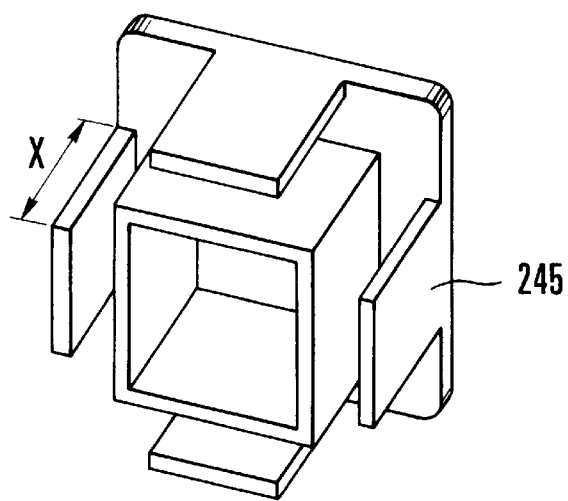
Figure 9:
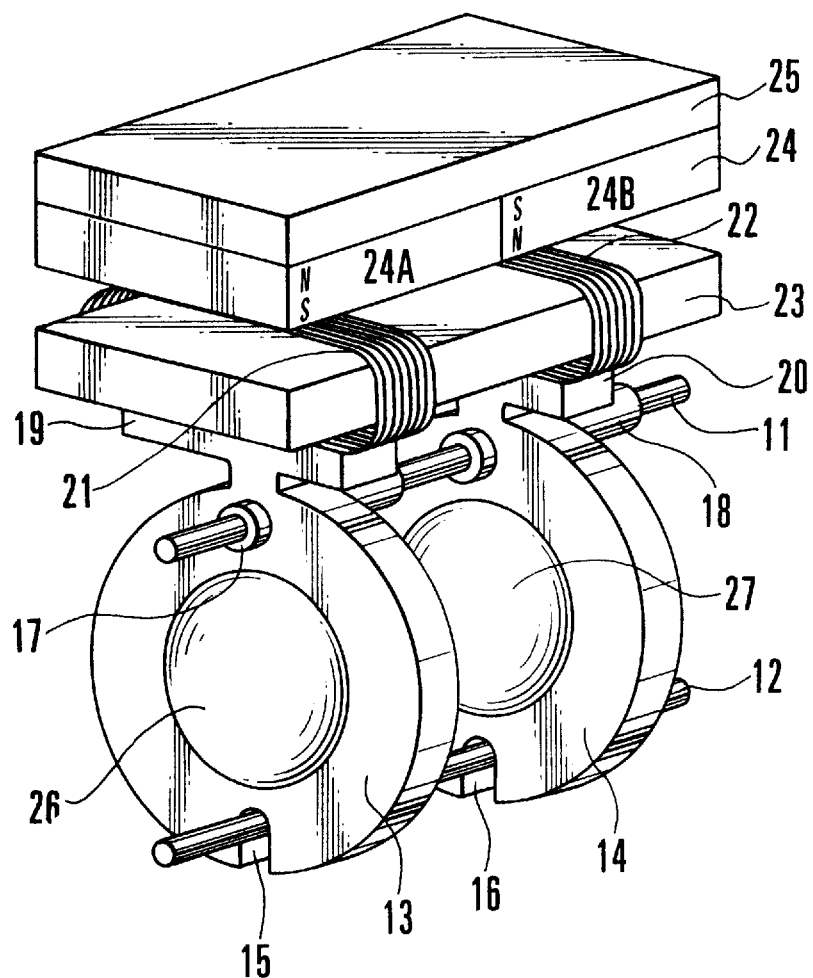
FIG. 9 is an oblique view of a VCM showing a first embodiment of this invention.

FIG. 9 is an oblique view of a VCM showing a first embodiment of this invention. Referring to FIG. 9, a movable lens group 26 is, for example, a variator lens group. Another movable lens group 27 is, for example, a focusing lens group. A guide bar 11 is provided for moving the movable lens groups 26 and 27 in the direction of an optical axis. A bar 12 serves as a steady rest for preventing the movable lens groups 26 and 27 from rotating on the bar 11. A moving ring 13 is arranged to hold the movable lens group 26. Another moving ring 14 is arranged to hold the movable lens group 27. U-shaped grooves 15 and 16 are provided in the peripheries of the moving rings 13 and 14, respectively, in such a way as to have the bar 12 fitted therein. Sleeves 17 and 18 are formed integrally with the moving rings 13 and 14, respectively, and are fitted on the bar 11 without any play. The sleeves 17 and 18 have a predetermined length in the direction of the optical axis so as to be capable of suppressing and preventing any eccentric state and play of the lens groups 26 and 27 from exceeding a predetermined degree. Coil mounting seats 19 and 20 are respectively formed integrally with the moving rings 13 and 14. Moving coils 21 and 22 are secured respectively to the coil mounting seats 19 and 20 with an adhesive or the like. There are provided yokes 23 and 25. The yoke 23 pierces the coils 21 and 22, which are coiled in a ring shape. A magnet 24 is composed of areas 24A and 24B which are magnetized in directions opposite to each other and aligned side by side in the direction of the optical axis of the lens groups 26 and 27. In this embodiment, one magnetic circuit is formed by these members 23, 24 and 25.

In the arrangement described above, when a current flows to each of the moving coils 21 and 22 across a magnetic flux obtained between the yoke 23 and the areas 24A and 24B of the magnet 24, a thrust is obtained in each of the moving coils 21 and 22 in the direction of the optical axis. Then, the position of each of the lens groups 26 and 27 is detected by a detecting means which is not shown. Thus, each of the moving coils 21 and 22 is individually controlled and driven so as to bring the lens groups 26 and 27 respectively to their desired positions.

Figure 10:
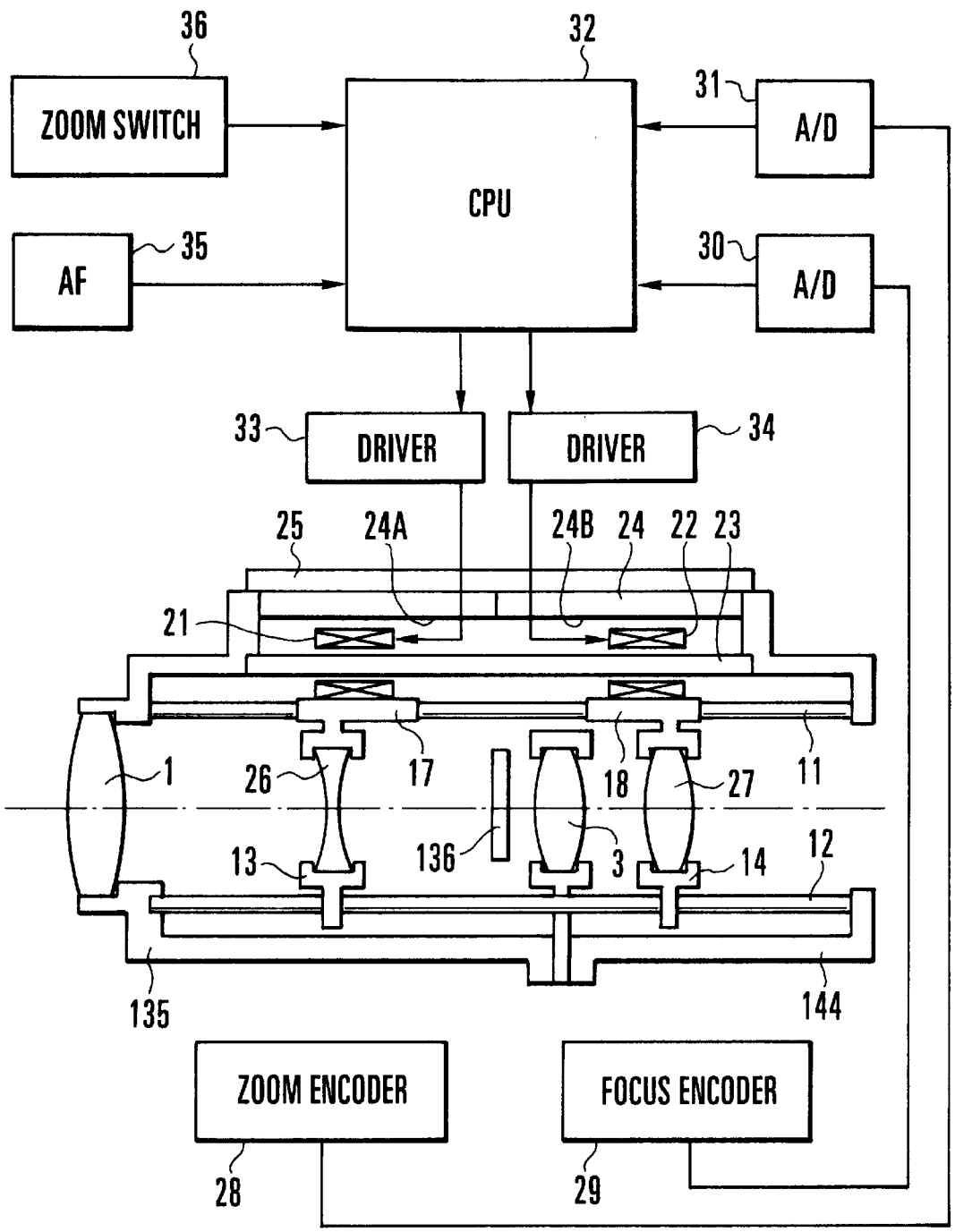
FIG. 10 is a block diagram showing a lens system arranged according to this invention.

FIG. 10 is a block diagram showing a lens system which is of the structural arrangement shown in FIG. 9. In FIG. 10, all the parts that are the same as those of FIG. 9 are indicated by the same reference numerals and any duplicate description is omitted here. Referring to FIG. 10, a zoom encoder 28 serves as a lens group position detecting means to detect the position of the variator lens group 26 in the direction of the optical axis. A focus encoder 29 serves as a lens group position detecting means to detect the position of the focusing lens group 27 in the direction of the optical axis. Incidentally, these encoders 28 and 29 may be arranged to operate in one of the various manners mentioned in the foregoing description of the related art.

Information on the results of detection made by the encoders 28 and 29 are taken into a CPU 32 through A/D converters 30 and 31, respectively. Information on a state of operation on a zoom switch 36 by the camera operator and information on a result of detection of a focused state by an AF system 35 are also taken into the CPU 32. The AF system 35 is arranged to detect a focused (or defocused) state on the basis of an image signal obtained from a CCD (not shown) which is arranged to have an object image formed thereon by lens groups 1, 26, 3 and 27.

The CPU 32 decides respective target positions of the lens groups 26 and 27 on the basis of the information or data mentioned above. The CPU 32 then decides the respective amounts of currents to be allowed to flow through the moving coils 21 and 22 by drivers 33 and 34 according to the target positions, respectively. This operation can be carried out by the lens position control method mentioned in the description of the related art given in the foregoing.

Figure 11:
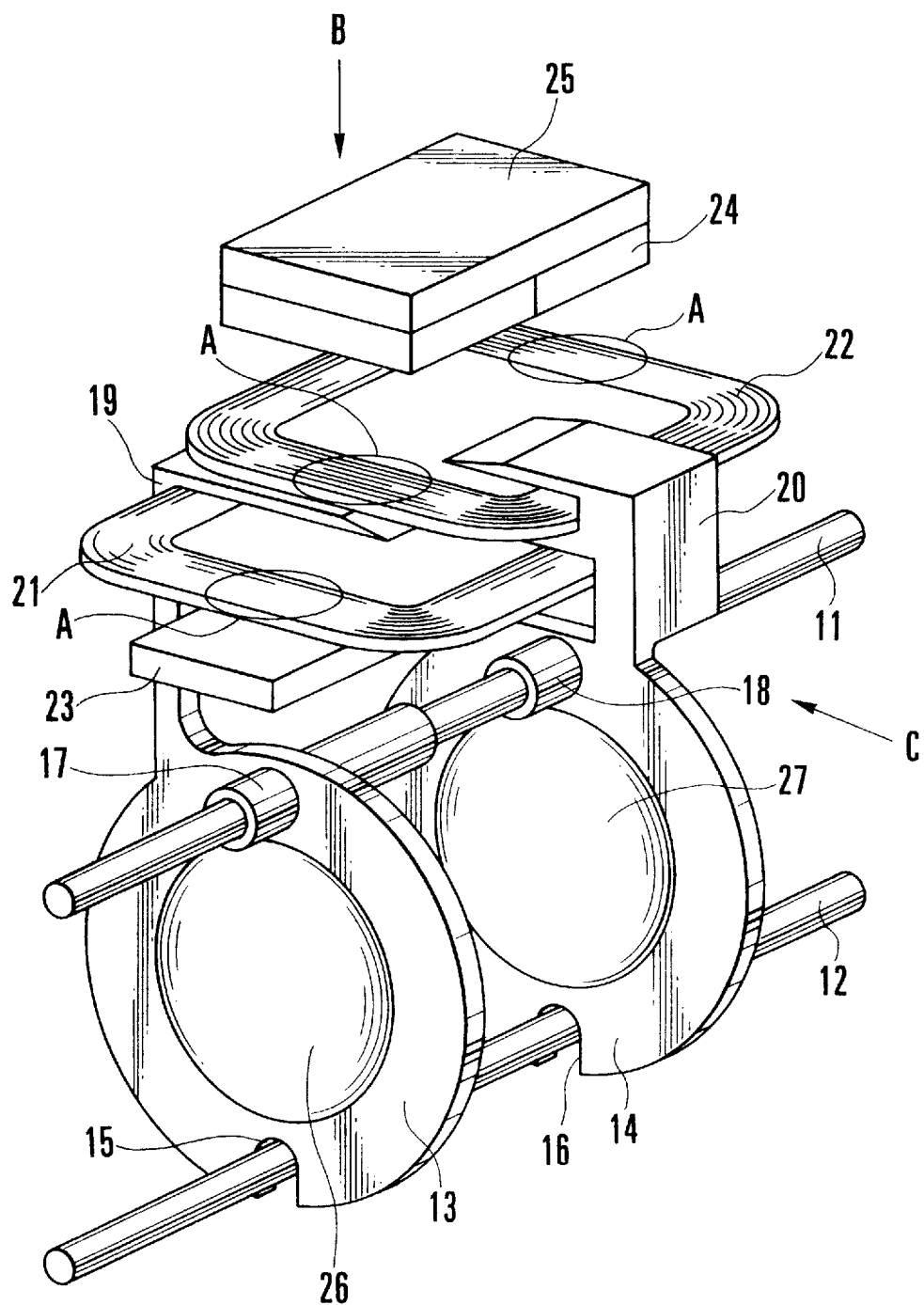
FIG. 11 is an oblique view of a VCM showing a second embodiment of this invention.
Figure 12:
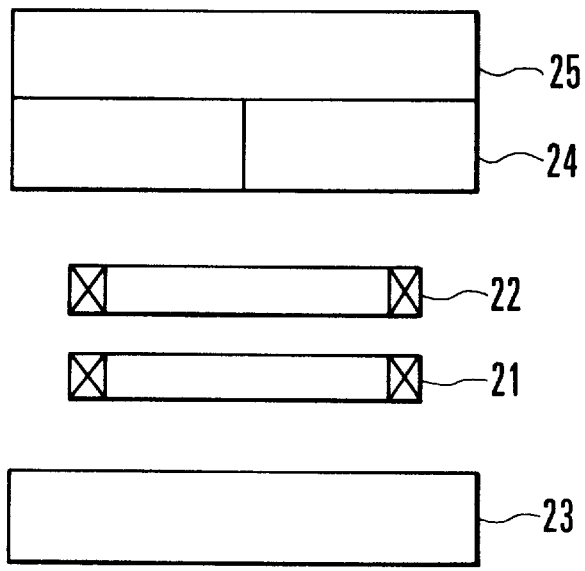
FIG. 12 is a schematic view showing the VCM of FIG. 11 as viewed from the direction of arrow C.

FIG. 11 shows a second embodiment of this invention. The same parts as those shown in FIGS. 9 and 10 are indicated by the same reference numerals and duplicate description of them are omitted. Unlike the first embodiment, the second embodiment has flat coils 21 and 22 disposed in an overlapped state between a yoke 23 and a magnet 24 as viewed from the direction of arrow B. FIG. 12 schematically shows the arrangement as viewed from the direction of arrow C of FIG. 11. A thrust is obtained with portions A of the flat coils 21 and 22 disposed within one magnetic circuit provided jointly by the members 23, 24 and 25. Portions which extend along an optical axis to interconnect the portions A are disposed outside the magnetic circuit. The flat coils 21 and 22 are secured to moving rings 13 and 14 through coil mounting seats 19 and 20, respectively, for example, by using an adhesive or by forming them together by insert molding.

The VCMs of the first and second embodiments can be manufactured at a lower cost and more simply than the prior art example described in the foregoing, since the yokes 23 and 25 are in a flat shape. The magnets may be formed also in a flat shape like the yokes. It is another advantage that a plurality of moving coils can be controlled with only one closed magnetic circuit.

Figure 13:
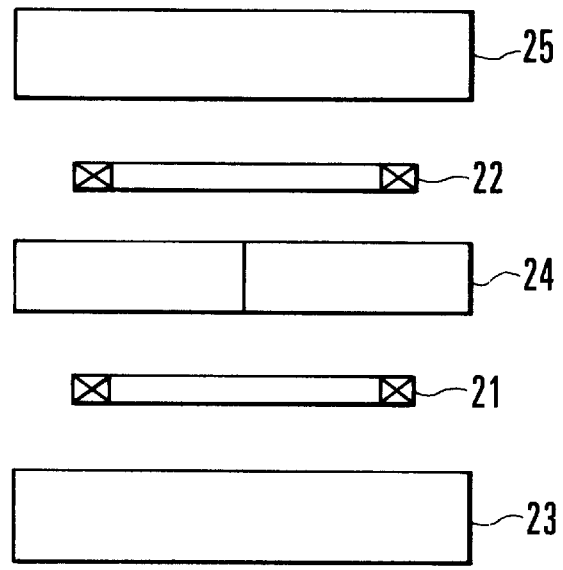
FIG. 13 is a schematic view of a VCM showing a third embodiment of this invention.

FIG. 13 shows another way of arranging the VCM as a third embodiment of this invention. In this case, gaps are provided between the magnet 24 and the yokes 25 and 23. The coils 21 and 22 are disposed respectively in these gaps. The arrangement of FIG. 13 is suited to a case where it is desired to avoid as much as possible any adverse effect of the magnetic field that results from the flow of currents through the coils.

Figure 14:
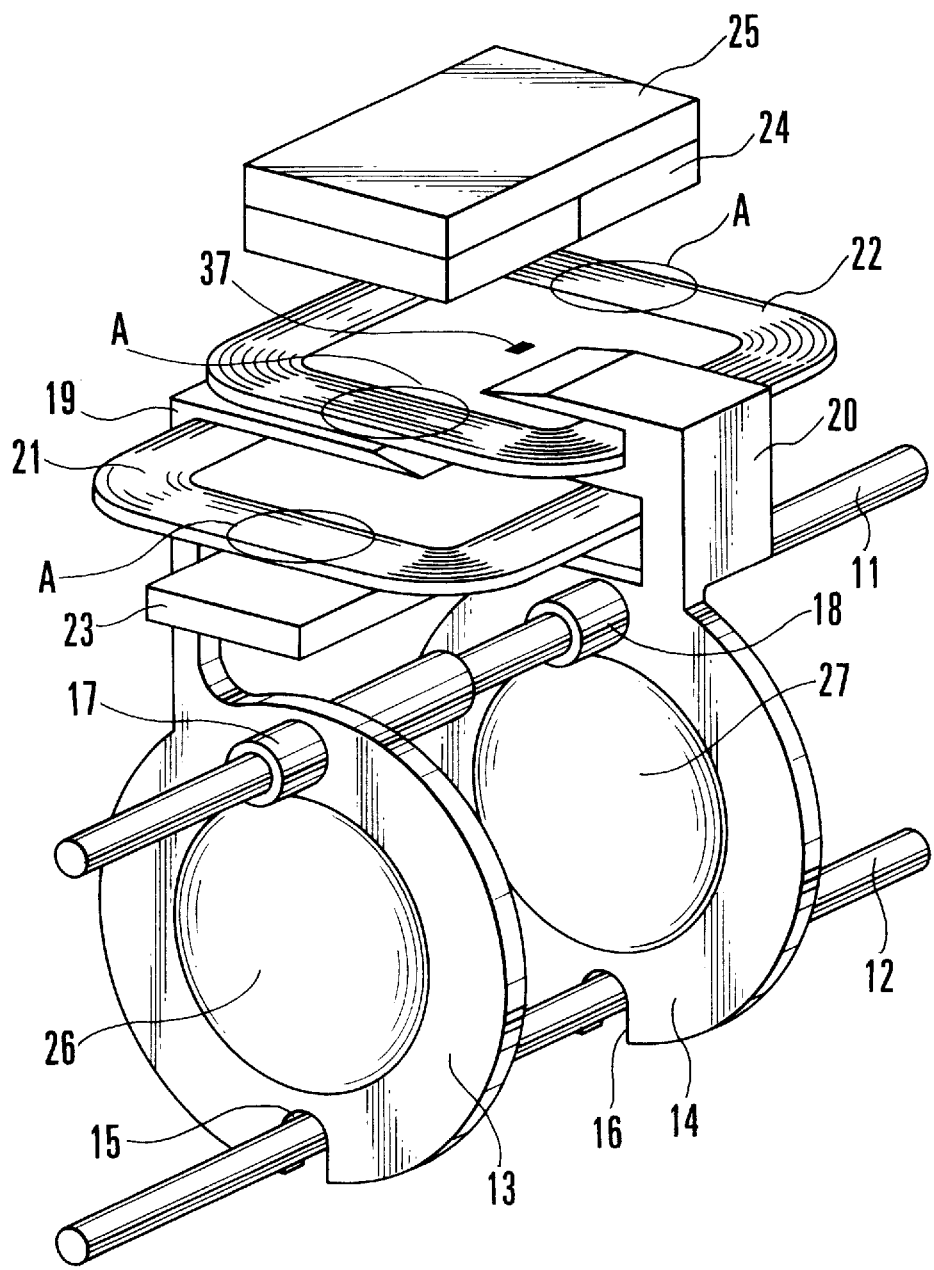
FIG. 14 is a schematic view of a VCM showing a fourth embodiment of this invention.

FIG. 14 shows, as a fourth embodiment of this invention, an improvement over the embodiment shown in FIG. 11. In a case where an incremental encoder is used in combination as a means for detecting the position of a movable lens group, a pulse count start position of the encoder can be easily determined by the arrangement of the fourth embodiment. In this case, a magnetic field intensity detecting element such as a Hall element or the like is used in determining the pulse count start position.

Referring to FIG. 14, a Hall element 37 is mounted as one unified body with the coil 22 and the moving ring 14 and is disposed in the middle part of the coil 22. The Hall element 37 disposed in this position is arranged, as shown in FIG. 15, to generate an output which becomes "0" at a position located approximately at a boundary between areas 24A and 24B which are magnetized in opposite directions and disposed side by side in a magnet 24. This position or a position around it where the magnet 24 generates a predetermined value is decided to be the pulse count start position. This arrangement thus enables the embodiment to detect the pulse count start position of the incremental encoder by just mounting the Hall element which is not expensive, so that the position of the moving lens group can be easily detected. The Hall element 37 may be disposed in a position deviating from the middle part in the moving direction. Another Hall element may be set also in the middle part of the other coil 21.

What is claimed is:
1. A driving device for driving a first driven member and a second driven member, comprising:
   forming means for forming one magnetic circuit, said forming means including a plurality of yokes and a permanent magnet disposed between said plurality of yokes;
   a first coil disposed at said first driven member; and
   a second coil disposed at said second driven member;
   wherein said first coil and said second coil are provided within said one magnetic circuit and arranged to move along a common axis by being respectively supplied with currents.

2. A device according to claim 1, wherein each of said plurality of yokes is in a flat plate shape, said permanent magnet is in a flat plate shape with a plurality of magnetic poles aligned in a direction of the axis, and said plurality of yokes and said permanent magnet are arranged to overlap each other and in parallel with each other.

3. A device according to claim 2, wherein said permanent magnet is disposed on a first yoke, a second yoke is disposed away from said permanent magnet and in parallel with said permanent magnet, and said second yoke pierces a void part of each of said first and second coils.

4. A device according to claim 3, wherein said first and second driven members are lens groups included in a lens system, and said common axis is an optical axis of said lens system.

5. A device according to claim 4, wherein said lens system is a zoom lens including a first lens group for variable power and a second lens group for focusing, and wherein said first coil is disposed at said first lens group and said second coil is disposed at said second lens group.

6. A device according to claim 5, wherein said first lens group is disposed nearer to an object side than said second lens group.

7. A device according to claim 2, wherein said first and second coils are coiled respectively along planes which are in parallel with said yokes and are disposed between a first yoke and a second yoke to overlap each other.

8. A device according to claim 7, wherein said first and second driven member are lens groups included in a lens system, and wherein said common axis is an optical axis of said lens system.

9. A device according to claim 8, wherein said lens system is a zoom lens including a first lens group for variable power and a second lens group for focusing, and wherein said first coil is disposed at said first lens group and said second coil is disposed at said second lens group.

10. A device according to claim 9, wherein said first lens group is disposed nearer to an object side than said second lens group.

11. A device according to claim 7, wherein said permanent magnet is disposed on said first yoke, said second yoke is disposed away from said permanent magnet and in parallel with said permanent magnet, and said first and second coils are disposed between said permanent magnet and said second yoke.

12. A device according to claim 3 wherein said permanent magnet is disposed in a position located away from said first and second yokes, said first coil is disposed between said first yoke and said permanent magnet, and said second coil is disposed between said permanent magnet and said second yoke.

13. A driving device for driving a first driven member and a second driven member, comprising:

forming means for forming one magnetic circuit;

a first coil disposed at said first driven member, and a second coil disposed at said second driven member, said first coil and said second coil being provided within said one magnetic circuit and arranged to move by being respectively supplied with currents; and sensors provided respectively at said first and second coils for detecting the intensity of magnetic fields of said first and second coils, outputs of said sensors being used in detecting the positions of said coils corresponding to said sensors.

\* \* \* \* \*

UNITED STATES PATENT AND TRADEMARK OFFICE
CERTIFICATE OF CORRECTION

PATENT NO.  : 5,828,503

DATED       : October 27, 1998

INVENTOR(S) : NAOYA KANEDA, ET AL.

It is certified that error appears in the above-identified patent and that said Letters Patent is hereby corrected as shown below:

COVER PAGE [56]
Foreign Priority Documents, "1130114" should read --1-130114--, and "01188811" should read --1-188811--; and U.S. Patent Documents, insert the following --5,541,777 07/30/96 Sakamoto et al. 359/824-- and --5,572,372 11/05/96 Sekine et al. 359/823--.

COVER PAGE [75],
Inventors, "Naoya Kaneda; Junichi Murakami, both of Kanagawa-ken, Japan" should read --Naoya Kaneda, Chigasaki; Junichi Murakami, Kawasaki, both of Japan--.

COLUMN 3,
Line 53, "$\alpha$," should read --$\infty$,-- (infinity).

COLUMN 9,
Line 31, "member" should read --members--.

COLUMN 10,
Line 13, "claim 3" should read --claim 7--;
Line 22, "means" should read --means, including a permanent magnet,--;
Line 30, "magnetic fields" should read --a magnetic field--, and "said first" should be deleted;

UNITED STATES PATENT AND TRADEMARK OFFICE
CERTIFICATE OF CORRECTION

PATENT NO. : 5,828,503

DATED : October 27, 1998

INVENTOR(S) : NAOYA KANEDA, ET AL.

It is certified that error appears in the above-identified patent and that said Letters Patent is hereby corrected as shown below:

COLUMN 10
Line 31, "and second coils," should read --the permanent magnet of said forming means,--, and "in" should be deleted; and
Line 32, "detecting the" should read --to detect respective--.

Signed and Sealed this

Tenth Day of August, 1999

Attest:

Q. TODD DICKINSON

Attesting Officer

Acting Commissioner of Patents and Trademarks